United States Patent
Al-Turki et al.

(10) Patent No.: US 10,839,269 B1
(45) Date of Patent: Nov. 17, 2020

(54) SYSTEM FOR FAST AND ACCURATE VISUAL DOMAIN ADAPTATION

(71) Applicant: King Abdulaziz University, Jeddah (SA)

(72) Inventors: Yusuf Al-Turki, Jeddah (SA); Abdullah Abusorrah, Jeddah (SA); Qi Kang, Shanghai (CN); Siya Yao, Shanghai (CN); Kai Zhang, Shanghai (CN); MengChu Zhou, Newark, NJ (US)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/825,617

(22) Filed: Mar. 20, 2020

(51) Int. Cl.
*G06N 20/00* (2019.01)
*G06K 9/62* (2006.01)
(Continued)

(52) U.S. Cl.
CPC ......... *G06K 9/6263* (2013.01); *G06N 3/0454* (2013.01); *G06N 3/08* (2013.01)

(58) Field of Classification Search
CPC ....... G06K 9/6263; G06N 3/0454; G06N 3/08
See application file for complete search history.

(56) References Cited

U.S. PATENT DOCUMENTS 9,189,735 B2 * 11/2015 Ni .............................. G06N 5/02
9,582,758 B2 * 2/2017 Takahashi ................ G06N 5/02
(Continued)

OTHER PUBLICATIONS

"Gan et al, Triangle Generative Adversarial Networks, 2017, 31st Conference on Neural Information Processing Systems, pp. 1-10" (Year: 2017).*

(Continued)

*Primary Examiner* — Gregory M Desire
(74) *Attorney, Agent, or Firm* — W&C IP

(57) ABSTRACT

In the field of computer vision, without sufficient labeled images, it is challenging to train an accurate model. But through visual adaptation from source to target domains, a relevant labeled dataset can help solve such problem. Many methods apply adversarial learning to diminish cross-domain distribution difference. They are able to greatly enhance the performance on target classification tasks. GAN (Generative Adversarial Networks) loss is widely used in adversarial adaptation learning methods to reduce a across-domain distribution difference. However, it becomes difficult to decline such distribution difference if generator or discriminator in GAN fails to work as expected and degrades its performance. To solve such cross-domain classification problems, an adaptation algorithm and system called as Generative Adversarial Distribution Matching (GADM) is implemented. In GADM, the objective function is improved by taking cross-domain discrepancy distance into consideration, and further minimize the difference through the competition between the generator and discriminator, thereby greatly decreasing the cross-domain distribution difference. Even when the performance of its generator or discriminator degrades, GADM is capable of decreasing the cross-domain distribution difference. The GADM algorithm and system employs a single GAN framework so as to achieve faster domain adaption with less computation resource. Specially, GADM transfers target data distribution to source one to keep accurate label dependence information, which ensures high accuracy and stability of source classifier and thus achieves better classification performance on target data.

8 Claims, 7 Drawing Sheets

(51) Int. Cl.
  *G06N 3/08* (2006.01)
  *G06N 3/04* (2006.01)

(56) References Cited

U.S. PATENT DOCUMENTS

| | | | | |
|---|---|---|---|---|
| 2006/0093209 | A1* | 5/2006 | Guetter | G06T 7/33 |
| | | | | 382/159 |
| 2012/0054130 | A1* | 3/2012 | Mensink | G06K 9/6263 |
| | | | | 706/12 |
| 2018/0121832 | A1* | 5/2018 | Abu-Mostafa | G06N 20/00 |
| 2018/0122048 | A1* | 5/2018 | Wang | G06T 3/4046 |
| 2019/0147320 | A1* | 5/2019 | Mattyus | G06K 9/6259 |
| | | | | 382/155 |
| 2019/0228336 | A1* | 7/2019 | Kanagawa | G06N 3/0481 |
| 2019/0279075 | A1* | 9/2019 | Liu | G06N 3/084 |

OTHER PUBLICATIONS

Aljundi et al: "Landmarks-based Kernelized Subspace Alignment for Unsupervised Domain Adaptation", CVPR2015, IEEE Xplore, pp. 56-63, 2015.
Bhattacharyya et al: "'Best-of-Many Samples" Distribution Matching', ICLR 2020, Sep. 27, 2019.
Bousmalis et al: "Domain Separation Networks", 30th Conference on Neural Information Processing Systems, 2016.
Cai et al: "Unsupervised Domain Adaptation with Adversarial Residual Transform Networks", IEEE, Sep. 18, 2019.
Cao et al: "Partial Adversarial Domain Adaptation", Computer Vision Foundation, ECCV 2018, 2018.
Cao et al: "Partial Transfer Learning with Selective Adversarial Networks", Computer Vision Foundation, CVPR, IEEE Xplore, pp. 2724-2732, 2018.
Chen et al: "Re-weighted Adversarial Adaptation Network for Unsupervised Domain Adaptation", Computer Vision Foundation, CVPR, IEEE Xplore, pp. 7976-7985, 2018.
Chen et al: "Blending-target Domain Adaptation by Adversarial Meta-Adaptation Networks", Computer Vision Foundation, CVPR, IEEE Xplore, pp. 2248-2257, 2018.
Csurka: "Domain Adaptation for Visual Applications: A Comprehensive Survey", Mar. 30, 2017.
Ganin et al: "Domain-Adversarial Training of Neural Networks", Journal of Machine Learning Research 17, pp. 1-35, May 26, 2016.
Goodfellow et al: "Generative Adversarial Nets", Universite de Montreal, 2014.
Gretton et al: "A Kernel Method for the Two-Sample-Problem", 2007.
Hu et al: "Duplex Generative Adversarial Network for Unsupervised Domain Adaptation", Computer Vision Foundation, CVPR, IEEE Xplore, pp. 1498-1507, 2018.
Huang et al: "AugGAN: Cross Domain Adaptation with GAN-based Data Augmentation", Computer Vision Foundation, ECCV 2018, 2018.
Kim et al: "Unsupervised Visual Domain Adaptation: A Deep Max-Margin Gaussian Process Approach", Computer Vision Foundation, CVPR, IEEE Xplore, pp. 4380-4390.
Kurmi et al: "Attending to Discriminative Certainty for Domain Adaptation", Computer Vision Foundation, CVPR, IEEE Xplore, pp. 491-500.
Lee et al: "Sliced Wasserstein Discrepancy for Unsupervised Domain Adaptation", Computer Vision Foundation, CVPR, IEEE Xplore, pp. 10285-10295, 2019.
Liu et al: "Coupled Generative Adversarial Networks", 30th Conference on Neural Information Processing Systems, 2016.
Long et al: "Learning Transferable Features with Deep Adaptation Networks", 32nd International Conference on Machine Learning, 2015.
Long et al: "Deep Transfer with Joint Adaptation Networks", 34th International Conference on Machine Learning, 2017.
Pan et al: "Transferrable Prototypical Networks for Unsupervised Domain Adaptation", Computer Vision Foundation, CVPR, IEEE Xplore, pp. 2239-2247.
Pei et al: "Multi-Adversarial Domain Adaptation", The Thirty-Second AAAI Conference on Artificial Intelligence, pp. 3934-3941, 2018.
Peng et al: "Moment Matching for Multi-Source Domain Adaptation", Aug. 27, 2019.
Rosca et al: "Distribution Matching in Variational Inference", Jun. 10, 2019.
Russo et al: "From source to target and back: Symmetric Bi-Direction Adaptive GAN", Computer Vision Foundation, CVPR, IEEE Xplore, pp. 8099-8108, 2018.
Saito et al: "Maximum Classifier Discrepancy for Unsupervised Domain Adaptation", Computer Vision Foundation, CVPR, IEEE Xplore, pp. 3723-3732, 2018.
Sankaranarayanan et al: "Generate to Adapt: Aligning Domains using Generative Adversarial Networks", Computer Vision Foundation, CVPR, IEEE Xplore, pp. 8503-8512, 2018.
Sankaranarayanan et al: "Learning for Synthetic Data: Addressing Domain Shift for Semantic Segmentation", Computer Vision Foundation, CVPR, IEEE Xplore, pp. 3752-3761, 2018.
Shen et al: "Wasserstein Distance Guided Representation Learning for Domain Adaptation", Mar. 9, 2018.
Sun et al: "Deep Coral: Correlation Alignment for Deep Domain Adaptation", Jul. 6, 2016.
Tahmoresnezhad et al: "Visual domain adaptation via transfer feature learning", Knowl Inf Syst, vol. 50, pp. 585-605, 2017.
Tzeng et al: "Deep Domain Confusion: Maximizing for Domain Invariance", Dec. 10, 2014.
Tzeng et al: "Aversarial Discriminative Domain Adaptation", Computer Vision Foundation, CVPR, IEEE Xplore, pp. 7167-7176, 2017.
Tzeng et al: "Simultaneous Deep Transfer Across Domains and Tasks", Computer Vision Foundation, ICCV, IEEE Xplore, pp. 4068-4076, 2015.
Volpi et al: "Adversarial Feature Augmentation for Unsupervised Domain Adaptation", Computer Vision Foundation, CVPR, IEEE Xplore, pp. 5495-5504.
Xu et al: "d-SNE: Domain Adaptation using Stochastic Neighborhood Embedding", Computer Vision Foundation, CVPR, IEEE Xplore, pp. 2497-2505.
Zellinger et al: "Central Moment Discrepancy (CMD) for Domain-Invariant Representation Learning", ICLR 2017, 2017.
Zhang et al: "Collaborative and Adversarial Network for Unsupervised domain adaptation", Computer Vision Foundation, CVPR, IEEE Xplore, pp. 3801-3809, 2018.
Zhang et al: "Importance Weighted Adversarial Nets for Partial Domain Adaptation", Computer Vision Foundation, CVPR, IEEE Xplore, pp. 8156-8164, 2018.

* cited by examiner (a) M(F)→U(F)

(b) U(F)→M(F)

SYSTEM FOR FAST AND ACCURATE VISUAL DOMAIN ADAPTATION

FIELD OF THE INVENTION

The invention generally relates to the field of computer vision and, more particularly, to a Generative Adversarial Distribution Matching (GADM) algorithm implemented in a system for fast and accurate visual domain adaption.

BACKGROUND

In the field of computer vision, when the images in training and testing datasets originate from the identical statistical distributions, convolutional neural networks based on sufficient labeled data can be used to train an accurate classifier. However, due to domain shift which is common in computer vision, data distributions between source and target domains can be highly different. Consequently, deep neural networks trained with enough labeled images may fail to adapt well in a target domain.

Among visual domain adaptation methods, using the labeled images of a target domain to further promote these neural network models is a representative way. Yet it is usually difficult and costly to get sufficient labeled data, hence making it unfeasible to adjust a great many parameters of deep neural networks. Studies intend to seek new domain adaptation approaches to visual domain adaptation problems. Moreover, they can gain their great application in areas of image classification, image feature learning, object recognition, and semantic segmentation.

Visual domain adaptation has been successfully achieved by neural network methods, which concentrate on transferring the representations from related source labeled images to the unlabeled target domain datasets. One of them is deep learning-based domain adaptation, which frequently uses Maximum Mean Discrepancy (MMD) (A. Gretton et al. *Advances in Neural Information Processing Systems* (2007) pp. 513-520) as a criterion to measure the distance across domains. Deep Adaptation Networks (M. Long et al. *ArXiv Prepr.*(2015):ArXiv150202791) and Joint Adaptation Networks (JAN) (M. Long et al. in *Proceedings of the 34th International Conference on Machine Learning* (2017)70: 2208-2217) apply this principle to layers embedded in a reproducing kernel Hilbert space, effectively matching higher order statistics of the two distributions. Deep Domain Confusion (DDC) (E. Tzeng et al. *ArXiv Prepr.*(2014): ArXiv14123474) takes MMD to learn both discriminative and domain invariant representations. In addition, deep Correlation Alignment (B. Sun and K. Saenko in *European Conference on Computer Vision* (2016) pp. 443-450) suggests to match the mean and covariance between the source and target distributions. Central Moment Discrepancy (W. Zellinger et al. *ArXiv Prepr.* (2017) ArXiv170208811) matches the higher order central moments of domain-specific latent feature representations. Moment Matching for Multi-Source Domain Adaptation (X. Peng et al. *ArXiv Prepr.* (December 2018) ArXiv181201754) dynamically aligns moments of feature distributions to transfer knowledge from multiple labeled source domains to an unlabeled target one. Besides, Wasserstein distance (see J. Shen et al. in *ArXiv Prepr.* (2018) ArXiv:1707.01217 [cs, stat] and C.-Y. Lee et al. in *Proceedings of the IEEE Conference on Computer Vision and Pattern Recognition* (2019) pp. 10285-10295), Hausdorff distance (X. Xu et al. in *Proceedings of the IEEE Conference on Computer Vision and Pattern Recognition* (2019) pp. 2497-2506), and optimal transport-based Earth-Mover distance in Re-weighted Adversarial Adaptation Network (RAAN) (Q. Chen et al. in *Proceedings of the IEEE Conference on Computer Vision and Pattern Recognition* (2018) pp. 7976-7985) are used to measure the difference between source and target data distributions. Y. Pan et al. (in *Proceedings of the IEEE Conference on Computer Vision and Pattern Recognition* (2019) pp. 2239-2247) present Transferrable Prototypical Networks (TPN) for adaptation such that the prototypes for each class in source and target domains are close in the embedding space. K. Saito et al. (in *Proceedings of the IEEE Conference on Computer Vision and Pattern Recognition* (2018) pp. 3723-3732) utilize task-specific classifiers to align distributions by minimizing the maximum classifier discrepancy. M. Kim et al. (in *Proceedings of the IEEE Conference on Computer Vision and Pattern Recognition* (2019) pp. 4380-4390) further extend it by modelling a classifier's hypothesis space in a Bayesian fashion to achieve high consistency through a Gaussian process.

Recently, adversarial adaptation plays a significant part in domain adaptation methods to solve the problems of visual domain adaptation. It aims to reduce cross-domain distribution difference via two adversarial objectives of a domain discriminator. The idea of these approaches is mainly derived from Generative Adversarial Networks (GAN) (I. Goodfellow et al. in *Advances in neural information processing systems* (2014) pp. 2672-2680), which consists of two neural networks—a generator and a discriminator. The former intends to generate new images in a way that confuses the latter which in turn attempts to distinguish them from real images. Many existing visual domain adaptation approaches have utilized this idea to guarantee that a network is unable to differentiate the images from source and target domains. Using an adversarial learning rule, GAN-based methods can effectively decrease the cross-domain distribution difference. For example, Domain Separation Networks (K. Bousmalis et al. in *Advances in neural information processing systems* (2016) pp. 343-351) and Domain Adversarial Neural Network (DANN) (Y Ganin et al. in *Domain Adaptation in Computer Vision Applications* (2017) pp. 189-209) share weights and transfer data from both source and target domains into a shared feature space. Moreover, Coupled Generative Adversarial Networks (Co-GAN) (M.-Y Liu and O. Tuzel in *Advances in Neural Information Processing Systems* (2016) pp. 469-477) build a partially asymmetric cross-domain mapping from source to target domains through decoupling some layers in neural networks. In recent days, discriminative modeling is successfully combined with GAN loss in Adversarial Discriminative Domain Adaptation (ADDA) (E. Tzeng et al. in the *Proceedings of the IEEE Conference on Computer Vision and Pattern Recognition* (2017) pp. 7167-7176) and Least Squares ADDA (LS-ADDA) (R. Volpi et al. in *Proceedings of the IEEE Conference on Computer Vision and Pattern Recognition* (2018) pp. 5495-5504) so as to gain a target mapping from a source domain. Generate to Adapt (GTA) (S. Sankaranarayanan et al. in *Proceedings of the IEEE Conference on Computer Vision and Pattern Recognition* (2018) pp. 8503-8512) induces a symbiotic relationship between the learned embedding and a generative adversarial network. (S.-W. Huang et al. in *Proceedings of the European Conference on Computer Vision* (ECCV) (2018) pp. 718-731) achieves cross-domain adaptation through GAN-based data augmentation, while R. Volpi et al. (in *Proceedings of the IEEE Conference on Computer Vision and Pattern Recognition* (2018) pp. 5495-5504) add one more GAN network to perform feature augmentation. There are many studies focusing on designing new GAN network structures or adding more GAN components. For example, P. Russo et al. (in the *Proceedings of the IEEE Conference on Computer Vision and Pattern Recognition* (2018) pp. 8099-8108) propose symmetric bi-directional adaptive GAN. Similarly, Z. Chen et al. (in the *Proceedings of the IEEE Conference on Computer Vision and Pattern Recognition* (2019) pp. 2248-2257) entail two adversarial transfer learning processes. L. Hu et al. (in *Proceedings of the IEEE Conference on Computer Vision and Pattern Recognition* (2018) pp. 1498-1507) use three parts: an encoder, a generator and duplex discriminators. A Collaborative and Adversarial Network (W. Zhang et al. in *Proceedings of the IEEE Conference on Computer Vision and Pattern Recognition* (2018) pp. 3801-3809) uses a set of feature extractors and domain classifiers to learn domain features. Multiple discriminators (MADA) (Z. Pei et al. in *Thirty-Second AAAI Conference on Artificial Intelligence* (2018)) have been used to solve the mode collapse problem in domain adaptation. Some studies closely related to MADA have been conducted in Selective Adversarial Network (Z. Cao et al. in *Proceedings of the IEEE Conference on Computer Vision and Pattern Recognition* (2018) pp. 2724-2732) and Partial Adversarial Domain Adaptation (Z. Cao et al. in *Proceedings of the European Conference on Computer Vision* (ECCV) (2018) pp. 135-150). Adversarial Residual Transform Networks (ARTNs) (G. Cai et al. *IEEE Trans. Neural Netw. Learn. Syst.*(2019) pp. 1-14 doi: 10.1109/TNNLS.2019.293538) use residual connections to share features and reconstruct adversarial loss. V. K. Kurmi et al. (in *Proceedings of the IEEE Conference on Computer Vision and Pattern Recognition* (2019) pp. 491-500) propose to estimate the probabilistic certainty of various regions of an image and focus on high-certainty regions during classification.

However, these previous GAN-based approaches highly depend on well-performing discriminators or generators during their corresponding algorithms' execution. Thus, it is hard to diminish cross-domain distribution difference any more once the performance of discriminators or generators degrades, hence resulting in unsteady or poor performance of domain adaptation.

Variational Auto-Encoders (VAEs) and GAN are both generative models which are commonly used to generate new images from random noises. However, in this invention, GAN is not used for this purpose, but more importantly, its adversarial principle is applied to match the distributions of source and target features. In detail, we utilize the generator as a feature extractor for target domain and take the discriminator as a domain classifier. Rosca et al. (*ArXiv Prepr.* (June 2019) ArXiv180206847 [Cs Stat]) propose VAE-GAN hybrids focusing on the challenges of training VAEs, which consistently fail to learn marginal distribution, and integrate GANs in a VAE framework to improve VAE generation quality. Similarly, Bhattacharyya et al. (*ArXiv Prepr.* (September 2019) ArXiv190912598 [Cs Stat]) integrate a GAN-based synthetic likelihood to the VAE objective. But they also aim to addressing the mode collapse issue of GAN besides the sample quality issues of VAE. In visual domain adaptation tasks, we have both source and target images, so it is unnecessary to generate a new image from random noises and hence there is no much worries about mode collapse and generation quality. In this invention, we pay attention to the vanishing gradient issue facing by GAN architecture and propose to deal with it by adding an MMD-based distance constraint in GAN's objective function.

SUMMARY

In one embodiment of the invention, a Generative Adversarial Distribution Matching (GADM) algorithm and system for fast and accurate visual domain adaptation is described. In operation, the GADM algorithm and system is based on the adversarial learning network of ADDA (E. Tzeng et al. in the *Proceedings of the IEEE Conference on Computer Vision and Pattern Recognition* (2017) pp. 7167-7176) but adds an MMD term by considering the data discrepancy distance in networks' objective function, with the hope to effectively and robustly decrease the cross-domain distribution difference by a discriminator and a generator competing against each other. The invention advances the area of GAN-based visual domain adaptation in at least the following aspects:

1) Adding MMD-Based Distance Constraint in GAN's Objection Function.

The added MMD term in the GADM algorithm and system is used to measure the distance between source and target data distributions, which is able to effectively solve the vanishing gradient problem faced by existing GAN-based methods when the original generator or discriminator performs badly. There are direct connections between data discrepancy distance in fully connected network layers and across-domain distribution difference. However, the former is not considered in the previous GAN-based method and its variants. The GADM algorithm and system adds one MMD constraint between source and target domains data, which provides gradient to minimize the cross-domain distribution difference when original GAN loss fails to provide gradient for updating parameters.

2) Utilizing Single GAN Framework to Achieve Faster Domain Adaptation.

In recent GAN-based methods, new network architectures (i.e., multiple adversarial networks (see Z. Chen et al. in the *Proceedings of the IEEE Conference on Computer Vision and Pattern Recognition* (2019) pp. 2248-2257, L. Hu et al. in *Proceedings of the IEEE Conference on Computer Vision and Pattern Recognition* (2018) pp. 1498-1507 and Z. Pei et al. in *Thirty-Second AAAI Conference on Artificial Intelligence* (2018)), residual network (see G. Cai et al. *IEEE Trans. Neural Netw. Learn. Syst.* (2019) pp. 1-14 doi: 10.1109/TNNLS.2019.2935384)) or different combinations of GAN components (i.e., generator/feature extractor/encoder, domain discriminator, and source/target classifier (see L. Hu et al. in *Proceedings of the IEEE Conference on Computer Vision and Pattern Recognition* (2018) pp. 1498-1507 and W. Zhang et al. in *Proceedings of the IEEE Conference on Computer Vision and Pattern Recognition* (2018) pp. 3801-3809)) are employed to improve adaptation performance. These GAN variants inevitably require much more computation resources and running time, especially during the training process of image object recognition. Instead, GADM is based on the original GAN structure, i.e., one generator, one domain discriminator and one classifier, and utilizes a single GAN framework without additional network connections, which greatly decreases the time complexity and improves the algorithm efficiency. Hence, the GADM algorithm and system is able to achieve faster domain adaption with less computation resource.

3) Transferring Target Data Distribution to Source One to Keep Accurate Label Dependence Information.

Different from some existing methods (G. Cai, Y et al. *IEEE Trans. Neural Netw. Learn. Syst.*(2019) pp. 1-14 doi: 10.1109/TNNLS.2019.2935384) that try to transfer source data distribution to target one, namely, make source data distribution similar to target one, the GADM algorithm and system keeps source feature unchanged and conducts adaptation towards target one. In this way, GADM is able to keep label dependence information of source data to the greatest extent, which ensures high accuracy and stability of a source classifier so as to achieve better classification performance on target data. Note that there are approaches conducting bi-directional (between a source and target (P. Russo et al. in the *Proceedings of the IEEE Conference on Computer Vision and Pattern Recognition* (2018) pp. 8099-8108)) domain adaptation. Such methods have higher computation complexity.

DESCRIPTION OF THE DRAWINGS

FIG. 4 (a)-(c) are three digits datasets: (a) USPS dataset, (b) MNIST dataset and (c) SVHN dataset. FIG. 4 (d)-(f) are three object recognition datasets: (d) Amazon dataset, (e) Webcam dataset and (f) DSLR dataset. FIG. 4 (g)-(h) are two medical image datasets: (g) Messidor dataset and (h) DR1 dataset.

FIGS. 6 (a) and (b) present their accuracy curves as iteration increases. FIGS. 6 (c) and (d) present the MMD-based distance as iteration increases.

DETAILED DESCRIPTION

Figure 1:
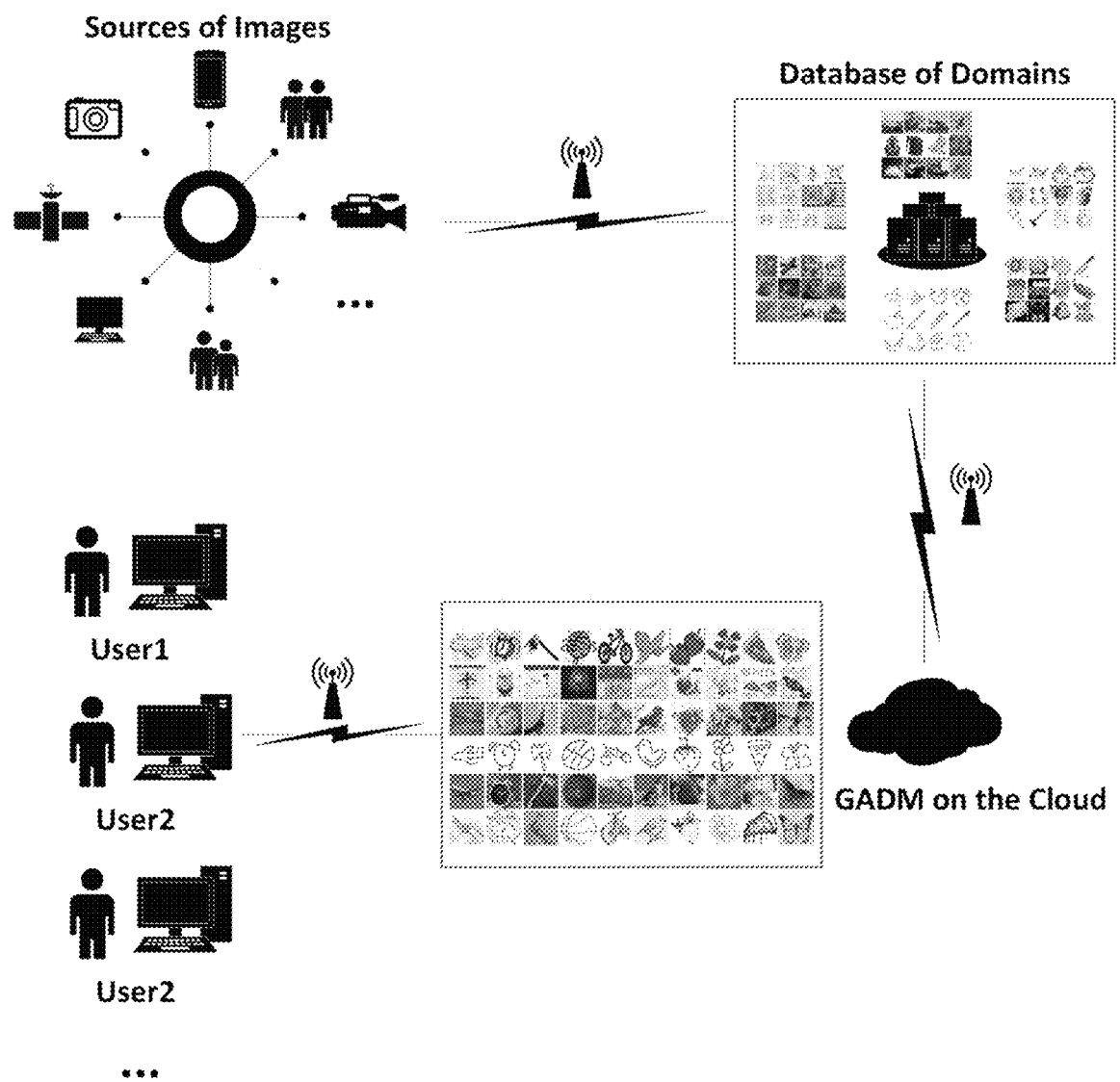
FIG. 1 is schematic diagram of Generative Adversarial Distribution Matching (GADM) system.

FIG. 1 is schematic diagram of Generative Adversarial Distribution Matching (GADM) system. There are many sources of images, e.g., real-world images (from mobile phones, cameras, satellite images, surveillance cameras and so on), simple strokes, paintings, computer graphics and so on. Images from different domains are transmitted to the data center and stored in the domain database. The GADM algorithm in the cloud have access to the domain database and conduct transferring among different domains. GADM matches the data distribution of different domains by Generative Adversarial Network (GAN), and then achieves the cross-domain adaption. When users need to transfer data from a different domain, they can access the GADM algorithm in the cloud and carry out their own domain adaption tasks in real time as shown in FIG. 1.

Figure 2:
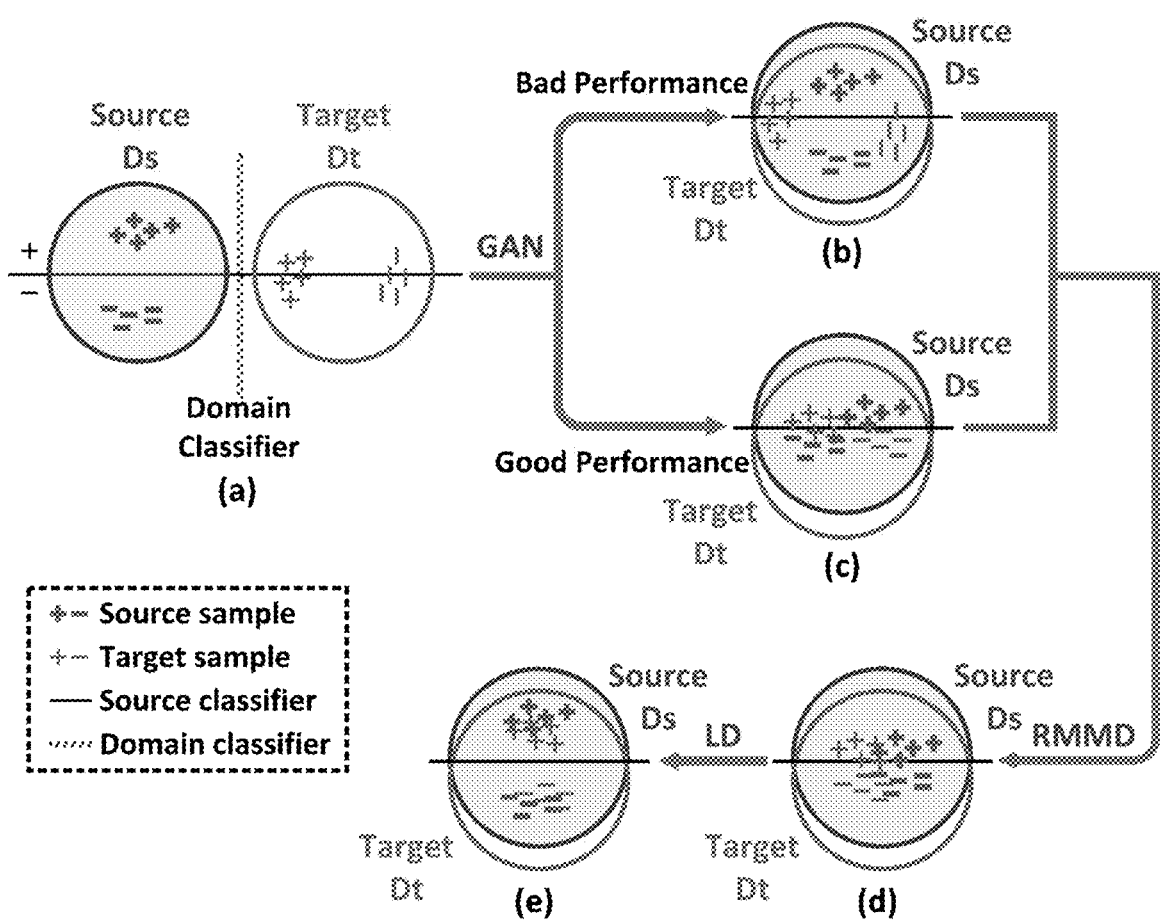
FIG. 2 is schematic diagram of GADM algorithm. (a) Original source and target domains, (b) and (c) After Generative Adversarial Network (GAN), (d) After Reduce Maximum Mean Discrepancy (RMMD), and (e) After adding Label Dependence (LD) information, where $D_s$ is source domain and $D_t$ is target one.

The GADM algorithm and system according to the invention efficiently decreases the cross-domain distribution difference by enabling a generator and a discriminator to compete against each other. We improve the objective function by adding a term to measure the cross-domain discrepancy distance between the fully connected network layers. In this way, although the generator or discriminator's performance declines, the proposed method is able to effectively reduce the cross-domain distribution difference. As shown in FIG. 2(a), the distributions between source and target domains are quite different from each other originally. After using GAN loss to map the target domain to a representation close to source domain, we have two situations: 1) When the generator or discriminator has bad performance, the distributions difference across domains cannot be reduced as shown in FIG. 2(b); and 2) When both generator and discriminator have good performance, the distributions across domains become similar as shown in FIG. 2(c). After Reducing Maximum Mean Discrepancy (RMMD) between the fully connected network layers, the data distributions of source and target domains become similar, but various samples of different classes are mixing in the subspace as shown in FIG. 2(d). This poses a big challenge for a subsequent classifier to accurately distinguish samples. Thus, we fix the parameters of source networks to keep the label information of the source domain. In this way, as in FIG. 2(e), the distribution difference between source and target domains is diminished, and in the meantime, different samples can be easily classified, thus leading to higher adaptation performance.

A. Problem Definition

Table I summarizes all notations used herein and their specific descriptions. The related concepts are as follows:

TABLE I

SYMBOLS AND DESCRIPTIONS

| Symbols | Description |
|---|---|
| $D_S$, $D_T$ | Source/target domain |
| $X_S$, $X_T$ | Source/target data |
| $Y_S$, $Y_T$ | Source/target data label |
| $M_S$, $M_T$ | Source/target mapping |
| $C_S$, $C_T$ | Source/target classifier |
| $n_1$, $n_2$ | Number of source/target samples |
| K | Classes |
| α | MMD weight |
| G | Generator |
| D | Discriminator |
| m | Batch size |

Definition 1 (Domain). A domain D = {X, P(x)}, where x ∈ X and X is a d-dimensional feature space, and P(x) denotes the marginal probability distribution.

Definition 2 (Task).

Given domain D, a task T can be denoted as T={Y, $f(x)$}, where y∈Y and Y is label space, and $f(x)=Q(y|x)$ is a prediction function that can be considered as the conditional probability distribution.

Figure 3:
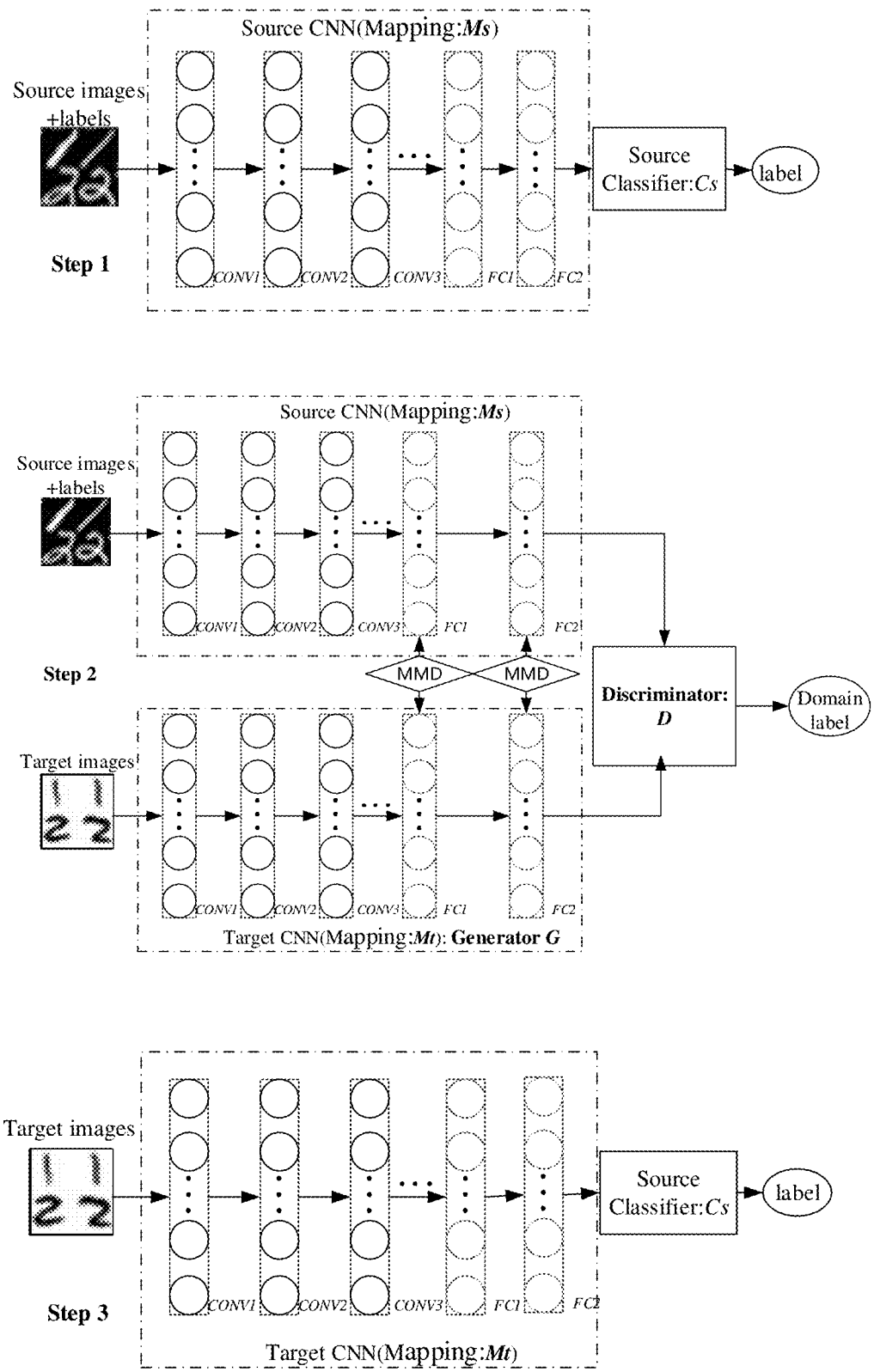
FIG. 3 is a schematic diagram showing the network architecture of GADM algorithm.

Generative Adversarial Distribution Matching (GADM):

Given a labeled source domain $D_S=\{X_S,Y_S\}$ and an unlabeled target domain $D_T=\{X_T\}$, under $P(X_S) \neq P(X_T)$ and $Q_S(Y_S|X_S) \neq Q_T(Y_T|X_T)$, GADM makes a generator (considering the cross-domain data discrepancy distance in its objective function) and a discriminator compete against each other, thereby reducing distribution difference across domains, as shown in FIG. 3.

B. Approach

The GADM algorithm and system implements the following three steps: source domain pre-training, adversarial distribution matching across domains, and target domain classification.

1) Source Domain Pre-training Step 1 FIG. 3

Since there are sufficient labeled images in a source domain, we first train a Convolutional Neural Networks (CNN) encoder with the labeled source images. Through adopting the source images $X_S$ and label $Y_S$, the source classifier can be obtained by using the following loss function (which is a standard loss function in supervised learning):

$$\min_{M_S, C_S} \ell_{cls}(X_s, Y_s) \quad (1)$$

Where $\ell_{cls}(X_S, Y_S) = -E_{(x_s, y_s) \sim (X_S, Y_S)} \sum_{k=1}^{K} 1_{[k==y_s]} \log C_S(M_S(x_s))$.

where $C_S$ is the source classifier, $M_S$ is the source mapping, K is the number of classes, $X_S$ is the source data, and $Y_S$ is the source data label.

2) Adversarial Distribution Matching Across Domains Step 2 FIG. 3

In supervised image learning, if a source domain has a large number of labeled images, it is easy to obtain source mapping $M_S$ and classifier $C_S$. However, for a target domain that does not have enough labels, a classification task is often difficult. With the assistance of the relevant source domain information, we can transfer a source domain classifier to a target one so as to get better classification performance in the target domain. This requires us to minimize the difference between source data and target data, that is, source-target domain adaptation. The adversarial adaptation learning method is a popular source-target domain adaptation method. Most of prior studies use source mapping parameters to initialize mapping parameters in the target domain, and minimize the distance between source mapping distribution $P_S(M_S(X_S))$ and target one $P_T(M_T(X_T))$ through different constraints. $C_S$, can be directly employed for target representations, namely, setting $C=C_S=C_T$. There is no need to separately learn a target classifier. A representative method is ADDA (E. Tzeng et al. in the *Proceedings of the IEEE Conference on Computer Vision and Pattern Recognition* (2017) pp. 7167-7176). It employs GAN loss to get $M_T$ via $M_S$ and updates a generated feature space until it cannot be distinguished with a fixed real space, hence decreasing the distribution difference between source mapping data $M_S(X_S)$ and target mapping data $M_T(X_T)$. Its generator's loss function is:

$$l_M(X_S, X_T, D) = -E_{x_t \sim X_t}[\log D(M_T(x_t))] \quad (2)$$

where D is a discriminator whose loss function is:

$$l_D(X_S, X_T, M_S, M_T) = -E_{x_s \sim X_s}[\log D(M_S(x_s))] - E_{x_t \sim X_T}[\log(1 - D(M_T(x_t)))] \quad (3)$$

Similar to the original GAN, we integrate (2) and (3) to get the following minmax objective function:

$$\min_{M_S, M_T} \max_D \ell(X_S, X_T, M_S, M_T) \text{ where } \ell(X_S, X_T, M_S, M_T) = \quad (4)$$

$$E_{x_s \sim X_S}[\log D(M_S(x_s))] + E_{x_t \sim X_T}[\log(1 - D(M_T(x_t)))].$$

Note that the parameters of $M_S$ are fixed during an iterative process because the goal is to optimize the parameters of target mapping $M_T$. The label dependence information of a source domain should be preserved. Thus we simplify (4) into:

$$\min_{M_T} \max_D \ell(X_S, X_T, M_T) \quad (5)$$

Following ADDA, we initialize $M_T$ by using the parameters of $M_S$. Then fix $M_T$ and take the partial differential of $l(X_S, X_T, M_T)$ with respect to D. We obtain the optimal D, i.e., $$D^* = \frac{P_S(M_S(x_s))}{P_S(M_S(x_s)) + P_T(M_T(x_t))} \quad (6)$$

To simplify its notation, we define z as a mapped sample. For $z \sim P_S$, $z = M_S(x_S)$; while for $z \sim P_T$, $z = M_T(X_T)$. Then (6) can be written as:

$$D^* = \frac{P_S(z)}{P_S(z) + P_T(z)} \quad (7)$$

Given $D^*$, the minmax loss (5) is reformulated as:

$$\min_{M_T} \ell(X_S, X_T, M_T) \quad (8)$$

where $\ell(X_S, X_T, M_T) =$ $$E_{z \sim P_S}[\log D^*(z)] + E_{z \sim P_T}[\log(1 - \log D^*(z))]$$

$$= E_{z \sim P_S}\left[\log\left(\frac{P_S(z)}{P_S(z) + P_T(z)}\right)\right] + E_{z \sim P_T}\left[\log\left(1 - \frac{P_S(z)}{P_S(z) + P_T(z)}\right)\right]$$

$$= E_{z \sim P_S}\left[\log\left(\frac{P_S(z)}{P_S(z) + P_T(z)}\right)\right] + E_{z \sim P_T}\left[\log\left(\frac{P_T(z)}{P_S(z) + P_T(z)}\right)\right]$$

$$= E_{z \sim P_S}\left[\log\left(\frac{P_S(z)}{\frac{P_S(z) + P_T(z)}{2}}\right)\right] + E_{z \sim P_T}\left[\log\left(\frac{P_T(z)}{\frac{P_S(z) + P_T(z)}{2}}\right)\right] - 2\log 2$$

$$= 2 \cdot JSD(P_S \| P_T) - 2\log 2$$

where JSD (·) is the Jensen-Shannon divergence describing the distance between two distributions. It is in the range of 0 and 1, and equals 0 when two distributions are same. Namely, when the distributions of source and target data are identical, $l^* = -2 \log 2$ is the global optimum of $l(X_S, X_T, M_T)$. In this case, the goal of adversarial domain adaptation is well achieved. However, S. Sankaranarayanan et al. (in *Proceedings of the IEEE Conference on Computer Vision and Pattern Recognition* (2018) pp. 8503-8512) and Z. Cao et al. (in *Proceedings of the IEEE Conference on Computer Vision and Pattern Recognition* (2018) pp. 2724-2732) prove that when we utilize a gradient descent algorithm to optimize $l(X_S, X_T, M_T)$, (8) is difficult to converge into its minimum because its gradient easily becomes zero where $JSD(P_S \| P_T) = \log 2$. Such vanishing gradient problem makes it difficult and sometimes impossible to minimize a loss function. Thus, when a generator or discriminator performs badly, GAN is not capable of transferring the target domain into the source domain completely. Hence, the cross-domain distribution difference cannot be minimized by loss function (5). Instead, the proposed GADM can keep reducing the distribution differences between $M_S(X_S)$ and $M_T(X_T)$ because it uses MMD to constrain the fully connected network layers between source and target encoder CNNs. Evidently, minimizing MMD between source and target domains means directly minimizing their distribution difference. The MMD of mapping data across domains from the a-th to b-th fully connected network layers is:

$$MMD = \frac{1}{m} \sum_{j=a}^{b} \alpha_j \left\| \phi\left(M_S^{l_j}(X_S)\right) - \phi\left(M_T^{l_j}(X_T)\right) \right\|_H^T \quad (9)$$

where $\alpha_j$ is the weight of the j-th MMD constraint for the j-th fully connected network layer, and $\phi$ is a mapping function.

Combining (5) and (9), we obtain the loss function in GADM:

$$\ell(X_S, X_T, M_T) = \quad (10)$$
$$E_{x_s \sim X_S}[\log D(M_S(x_s))] + E_{x_t \sim X_T}[\log(1 - D(M_T(x_t)))] +$$
$$E_{(x_s, x_t) \sim (X_S, X_T)} \left[ \sum_{j=a}^{b} \alpha_j \left\| \phi\left(M_S^{l_j}(x_s)\right) - \phi\left(M_T^{l_j}(x_t)\right) \right\|_H^2 \right]$$

Then (8) is reformulated as:

$$\min_{M_T} \ell(X_S, X_T, M_T) \text{ where } \ell(X_S, X_T, M_T) = 2 \cdot JSD(P_S \| P_T) - \quad (11)$$
$$2\log 2 + E_{(x_s, x_t) \sim (X_S, X_T)} \left[ \sum_{j=a}^{b} \alpha_j \left\| \phi\left(M_S^{l_j}(x_s)\right) - \phi\left(M_T^{l_j}(x_t)\right) \right\|_H^2 \right]$$

Hence, in GADM, when (8) equals 0 and fails to provide gradient for updating parameters, the added MMD loss is non-zero and thus provides gradient to minimize (11). Then, the process of alternately optimizing D and $M_T$ leads to the narrowing of distribution difference across domains. When an iteration process ends, the encoder CNN in the target domain gains the final parameters of target mapping.

3) Target Domain Classification Step 3 FIG. 3

Using obtained target mapping $M_T$ and target classifier $C_T$, we carry out a classification task in the target domain. Since the distribution of $M_T(X_T)$ is similar to that of $M_S(X_S)$ now, target classifier $C_S$ can be directly applied to $M_T(X_T)$, which eliminates the need to learn the $C_T$ by simply setting, $C_T = C_S$. Then the classification formula of target domain is:

$$Y_T = C_S(M_T(X_T)) \quad (12)$$

With (12), we finally manage to obtain the label of all the data in target domain.

The learning steps of GADM is realized in Algorithm 1.

---

Algorithm 1: GADM

Input: Source domain dataset $D_S = \{X_S, Y_S\}$, and target domain dataset $D_T = \{X_T\}$;
Parameters, m: batch size, N: iterations; α: MMD weight.
Process:
Step 1: for n in 1:N do:
  (1) Sample m data with labels from source domain $\{(x_s^{(1)}, y_s^{(1)}), \ldots, (x_s^{(m)}, y_s^{(m)})\}$
  (2) Update the parameters of source mapping $M_S$ and classifier $C_S$ using the following objective:

$$\nabla_{M_S, C_S} \frac{1}{m} \sum_{i=1}^{m} \sum_{k=1}^{K} 1_{[k==y_s^{(i)}]} \log C_S(M_S(x_s^{(i)}))$$

---

Algorithm 1: GADM

Step 2: for n in 1:N do:
  (1) Sample m data with labels from source domain $\{(x_s^{(1)}, y_s^{(1)}), \ldots, (x_s^{(m)}, y_s^{(m)})\}$
  (2) Sample m data with labels from target domain $\{x_t^{(1)}, \ldots, x_t^{(m)}\}$
  (3) Freeze the parameters of discriminator D, and update the parameters of target mapping $M_T$:

$$\nabla_{M_T} \frac{1}{m} \sum_{i=1}^{m} \left[ -\log D(M_T(x_t^{(i)})) + \sum_{j=a}^{b} \alpha_j \left\| \phi\left(M_S^{l_j}(x_s^{(i)})\right) - \phi\left(M_T^{l_j}(x_t^{(i)})\right) \right\|_H^2 \right]$$

(4) Freeze the parameters of source mapping $M_S$ and target mapping $M_T$, and update the parameters of discriminator D:

$$\nabla_D \frac{1}{m} \sum_{i=1}^{m} [-\log D(M_S(x_s^{(i)})) - \log(1 - D(M_T(x_t^{(i)})))]$$

Step 3: for the target domain data $X_T$, using the following equation to calculate labels $Y_T$:
  $Y_T = C_S(M_T(X_T))$
Return: Source domain data labels $Y_T$.

C. Algorithm Complexity

We analyze the algorithm complexity of GADM as follows:

Step 1: Use source domain data and labels to obtain source mapping $M_S$ and classification:

$$O\left(N \cdot m \left( \sum_{i=1}^{C} M^2 K^2 C_{i-1} C_i + \sum_{j=1}^{F} F_{j-1} F_j \right)\right) \quad (13)$$

where N is iterations, m is batch size, C is the number of convolutional layers in CNN, M is the output feature map size of convolution kernel, K is the convolution kernel size, $C_i$ is the number of kernels in the i-th convolutional layer, F is the number of fully connected layers in CNN, and $F_j$ is the number of neurons in the j-th fully connected layer.

Step 2: Update the generator G to obtain target mapping $M_T$:

$$O\left(N \cdot m \left( \sum_{i=1}^{C} M^2 K^2 C_{i-1} C_i + \sum_{j=1}^{F} F_{j-1} F_j + \alpha_j \sum_{j=1}^{F} F_j \right)\right) \quad (14)$$

where $\alpha_j$ is the MMD weight of the j-th fully connected layer.

Step 3: Update discriminator D to obtain its parameters:

$$O\left(N \cdot m \left( \sum_{j=1}^{P} P_{j-1} P_j \right)\right) \quad (15)$$

where P is the number of fully connected layers in the discriminator, and $p_j$ is the number of neurons in the j-th fully connected layer.

In conclusion, the computational complexity of GADM is $$O\left(N \cdot m \left( \sum_{i=1}^{C} M^2 K^2 C_{i-1} C_i + \sum_{j=1}^{F} F_{j-1} F_j + \alpha_j \sum_{j=1}^{F} F_j + \sum_{j=1}^{P} P_{j-1} P_j \right)\right).$$

Example

Figure 4:
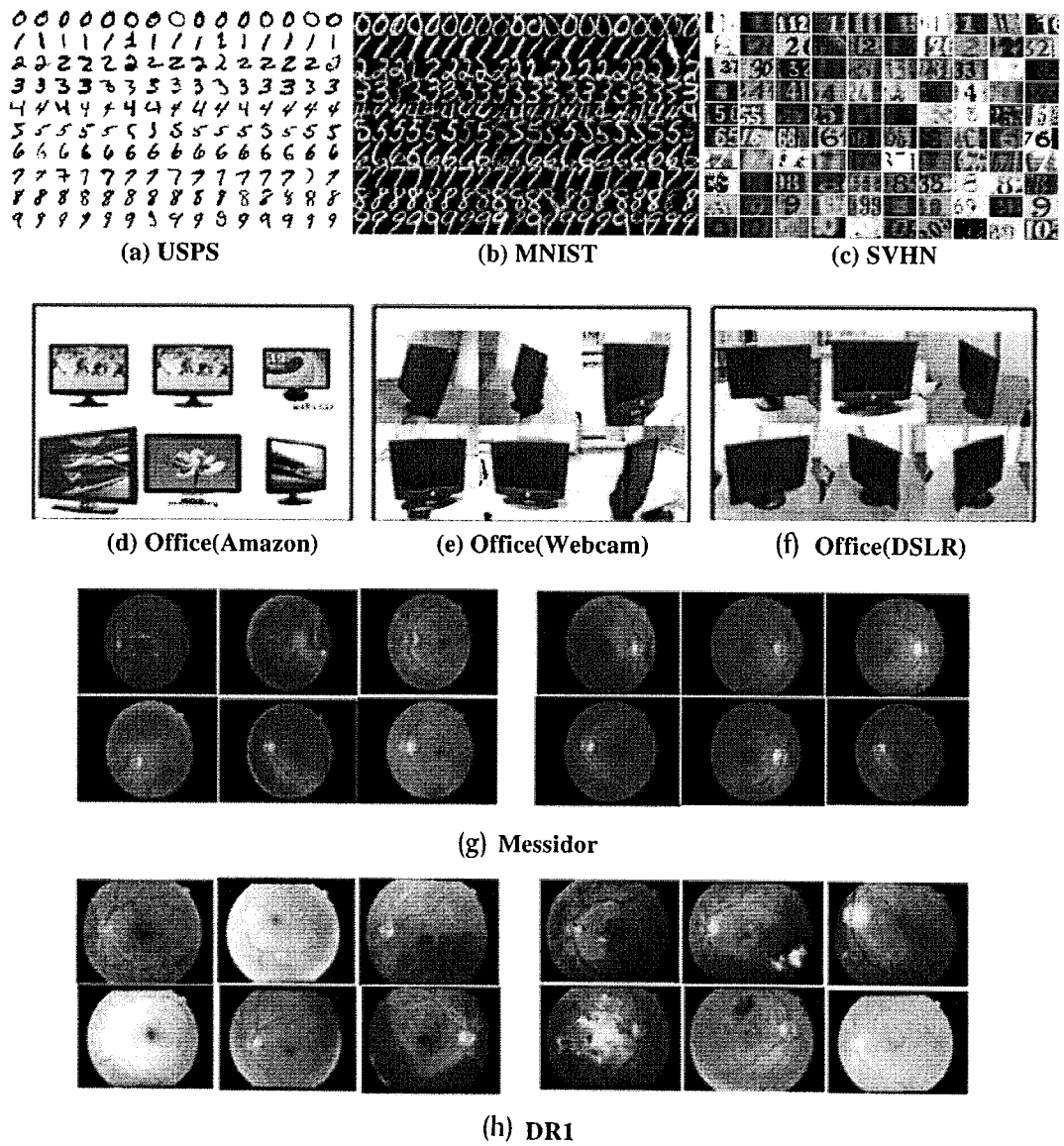
FIG. 4 shows a series of examples of three benchmark datasets in visual domain adaptation.

We assess our visual domain adaptation methods on image classification tasks. We carry out experiments on three cross-domain tasks: digit classification (USPS, MNIST and SVHN), object recognition (OFFICE-31) and medical image classification (DR1 and Messidor). Examples of these three datasets are shown in FIG. 4. Note that, the visual domain adaptation tasks on these datasets vary in difficulty, and the task on cross-domain diabetic retinopathy images is the hardest one. Based on these datasets, we obtain 11 pair of cross-domain image datasets. The experimental results indicate that GADM outperforms its peers with higher average classification accuracy with almost same computing speed.

Datasets and Data Preparation

Experiments are carried out on three cross-domain image datasets for visual domain adaptation approaches. They are USPS+MNIST+SVHN, OFFICE-31 and Messidor+DR1.

In the first series of experiments, we evaluate the performance of GADM on digit datasets, i.e., USPS in FIG. 4(a), MNIST in FIG. 4(b) and SVHN in FIG. 4(c). Here, we utilize their full data to build training sets. USPS denoted as U includes 7291 images, and MNIST denoted as M contains 60000 images, and there are 73257 images in SVHN denoted as S. As in ADDA (E. Tzeng et al. in the *Proceedings of the IEEE Conference on Computer Vision and Pattern Recognition* (2017) pp. 7167-7176), we consider 3 tough visual domain adaptation tasks, i.e., U→M, M→U, and S→M.

In the second series of experiments, we evaluate GADM's performance with a more difficult object recognition task based on OFFICE-31 datasets. There are three domains that are AMAZON in FIG. 4(d) denoted as A, WEBCAM in FIG. 4(e) denoted as W, and DSLR in FIG. 4(f) denoted as D. Each domain dataset consists of 31 different classes, and includes 2817, 498 and 795 images respectively. We carry out experiments on 6 source-target domain pairs, i.e., A→D, A→W, D→A, D→W, W→A, and W→D.

In the last series of experiments, we use diabetic retinopathy datasets Messidor in FIG. 4(g) and DR1 in FIG. 4(h) to construct cross domain images datasets, which are highly difficult to conduct images classification by using traditional learning methods. Messidor contains 1200 images and three different image resolution, which are 1440×960, 2240×1488 and 2304×1536. DR1 has 1077 images and the resolution of image is 640×480. Datasets DR1 (denoted as DR) and Messidor (denoted as MR) have different resolution and collected by different healthcare personnel, which lead to different probability distributions. Thus, we use MR→DR as a cross domain dataset by collecting 1200 images from Messidor and 1077 images from DR1. Then we obtain another dataset DR→MR by switching source/target pairs.

Experimental Setup

We regard classification accuracy as the evaluation metric in our experiments. The classification accuracy is defined as follows:

$$\text{Accuracy} = \frac{|x : x \in D_T \wedge y_p(x) = y(x)|}{|x : x \in D_T|} \quad (16)$$

where $D_T$ is target domain dataset, $y(x)$ is the truth label of x, and $y_p(x)$ is the predicted one.

In order to compare the distributions of cross domain data after different methods are applied, we directly take MMD between the last layers of source and target networks as the distance measurement between source and target data distributions. Denoted it as $D_{MMD}$, we have:

$$D_{MMD} = \left\| \frac{1}{m}\sum_{i=1}^{m} \phi(x_s^i) - \frac{1}{n}\sum_{i=1}^{n} \phi(x_t^i) \right\|_H^2 \quad (17)$$

where $x_s^i$ is the i-th data item of source domain, m is the number of source data items. Correspondingly, $x_t^i$ is the i-th data item of target domain, n is the number of target data items.

To verify the effectiveness of the GADM, we compare it with GAN-based visual domain adaptation methods i.e., DANN (Y. Ganin et al., 2017), ADDA (E. Tzeng et al., 2017), RAAN (Y. Pan et al., 2019), CoGAN (M. Y. Liu et al., 2016), LS-ADDA (R. Volpi et al., 2019), GTA (A. Radford et al., 2015) and TPN (K. Saito et al., 2018) DDC(V. K. Kurmi et al., 2019), DANN (Y. Ganin et al., 2017), JAN (E. Tzeng et al., 2016), MADA (Z. Pei et al., 2018) and ARTN (Z. Cao et al., 2018). In particular, ADDA (E. Tzeng et al., 2017) and LS-ADDA (R. Volpi et al., 2019) are most similar to GADM, but GADM have different objective function. In GADM, we add the MMD constraint between source and target domains data, hence reducing the cross-domain distribution difference even if the original generator or discriminator performs badly. Note that we only choose the last fully connected network layer to calculate MMD. According to (9), there is only one weight of MMD term, i.e., $\alpha_3$ (VGG16 has three fully connected network layers). In the following discussion, we take a simple notation $\alpha$ to mean $\alpha_3$. In our experiments The label dependence information between source data and labels are preserved by freezing the parameters of source mapping, which is also better for visual domain adaptation.

Under our experimental conditions, it is impossible to tune the optimal parameters with cross validation because source and target domain data are originated from different distributions. Thus each method is evaluated by empirically adjusting parameters to find its proper parameter setting that gives the highest accuracy on each dataset. Moreover, for parameter $\alpha$ in GADM, we set $\alpha \in \{10.1, 0.01, 0.001, 0.0001\}$ and select a proper one for each cross-domain dataset.

We employ the modified LeNet architecture (which is available in the Tensorflow) to conduct experiments towards digit datasets. There are 3 fully connected layers: [500, 500, 2] in the adversary discriminator. ReLU is taken as an activation function in each 500-unit layer. For the case of digit datasets, the GADM training algorithm is set to iterate 10000 times with a batch size of 128. As for the experiments of OFFICE-31 and diabetic retinopathy datasets, our base architecture is VGG16, initializing from weights pre-trained on ImageNet. The full connection layer of the network in VGG16 is fine-tuned on the source domain for 2000 iterations with a batch size of 64 while the parameters of other layers are fixed. GADM training then proceeds for another 100 iterations with a batch size of 32.

Classification Results and Analysis

Table II shows the digit classification accuracies of GADM with seven baseline domain adaptation methods. Table III displays the classification accuracies on OFFICE-31. Table IV displays the experimental results on cross-domain diabetic retinopathy image datasets. The best method for each dataset is highlighted in bold. Table V presents the t-test and Wilcoxon's test results to compare GADM with the most related method ADDA in term of accuracy. Pwilcoxon and Pt-test is the p-value of Wilcoxon's test and t-test, respectively. When Pwilcoxon<0.05 and Pt-$_{test}$<0.05, GADM performs significantly better, which is highlighted in bold. As for parameters initialization, GADM employs all source data to train source CNN and transfer its parameters to $M_T$, which is the same as ADDA.

Table II shows that GADM outperforms other methods on M→U and U→M with high classification accuracy 95.3% and 97.4% respectively, whereas for the standard CNN without adaptation it is only 75.2% and 57.1%. GADM gains a great improvement of 20.1% and 22.2%. Also, GADM gets an improvement of 5.9% and 7.3% over the most related method ADDA. On the difficult cross-domain datasets S→M, CoGAN (M. Y. Liu et al., 2016) fails to converge and TPN (K. Saito et al., 2018) achieves the best performance. Although GADM only achieves an accuracy 78.0%, it still improves 2.0% over ADDA.

TABLE II

ACCURACY (%) OF ALGORITHMS ON DIGIT DATASETS

| Algorithms | M→U | U→M | S→M |
|---|---|---|---|
| CNN (Source only) | 75.20 | 57.10 | 60.10 |
| DANN (Y. Ganin et al., 2017) | 77.10 | 73.00 | 73.90 |
| ADDA (E. Tzeng et al., 2017) | 89.40 | 90.10 | 76.00 |
| RAAN (Y. Pan et al., 2019) | 88.30 | 91.50 | 80.70 |
| CoGAN (M.Y. Liu et al., 2016) | 91.20 | 89.10 | Not converged |
| LS-ADDA (R. Volpi et al., 2019) | 91.40 | 91.00 | 74.30 |
| GTA (A. Radford et al., 2015) | 92.50 | 90.80 | 84.70 |
| TPN (K. Saito et al., 2018) | 92.10 | 94.10 | 93.00 |
| GADM | 95.30 | 97.40 | 78.00 |

Table III presents detailed performance comparison on OFFICE-31 datasets. In all six tasks, MADA achieves the best performance in A→W, D→W and W→D, and ARTNs gain the highest accuracy in A→D, D→A and W→A. Note that MADA and ARTNs are based on ResNet. which contains more network connections than our basic network VGG16. Moreover, MADA presents a multi-adversarial approach based on multiple domain discriminators, and ARTNs add residual connections between a feature extractor and a transform network. Thus, these two methods require much more computation expense than GADM. Except MADA and ARTNs, our proposed GADM achieves the highest accuracy on four tasks, i.e., A→D, A→W, D→A and W→A. In D→W and W→D, GADM achieves the second highest accuracy of 93.21% and 97.99%, which is slightly behind the best performance 95.00% and 98.75% obtained by DDC (V. K. Kurmi et al. 2019). Especially, compared with the most related ADDA, GADM gains a significant performance improvement of 26.02%, 23.9%, 11.48%, 46.73%, 10.1% and 51.51%.

TABLE III

ACCURACY (%) OF ALGORITHMS ON OFFICE-31 DATASETS

| Algorithms | A→D | A→W | D→A | D→W | W→A | W→D |
|---|---|---|---|---|---|---|
| DDC (V. K. Kurmi et al., 2019) | 64.40 | 61.80 | 52.10 | 95.00 | 52.20 | 98.50 |
| DANN (Y. Ganin et al., 2017) | 41.36 | 41.35 | 41.34 | 46.78 | 44.68 | 46.78 |
| ADDA (E. Tzeng et al., 2017) | 43.66 | 43.65 | 42.76 | 46.48 | 45.95 | 46.48 |
| JAN (E. Tzeng et al., 2014) | 35.67 | 43.39 | 51.04 | 53.56 | 51.57 | 53.56 |
| MADA (Z. Pei et al., 2018) | 74.10 | 78.50 | 56.00 | 99.80 | 54.50 | 100 |
| ARTNs (Z. Cao et al., 2017) | 76.10 | 76.20 | 60.90 | — | 61.00 | — |
| GADM | 69.68 | 67.55 | 54.24 | 93.21 | 56.05 | 97.99 |

Figure 5:
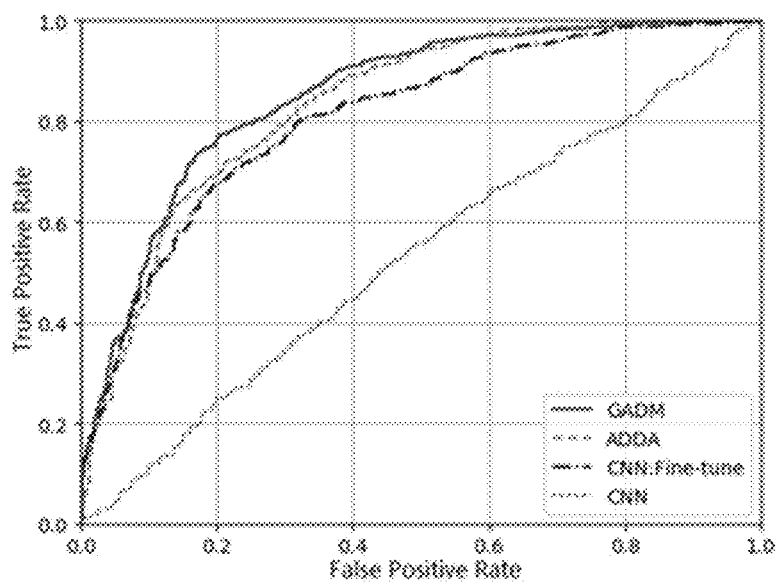
FIG. 5 shows the ROC curves of two domain adaptation tasks: (a) MR→DR and (b) DR→MR.
Figure 5:
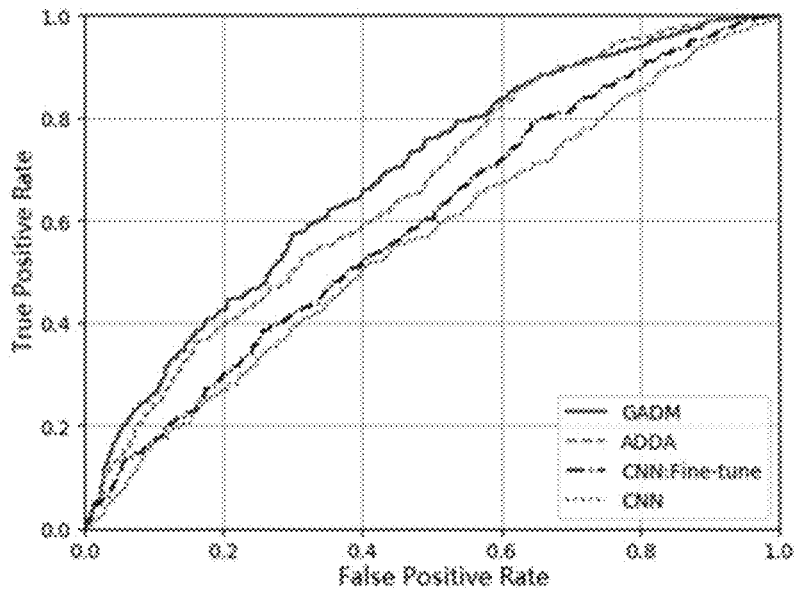

Table IV shows the results of experiments towards cross-domain diabetic retinopathy image datasets. For better interpretation, the ROC results of two tasks MR→DR and DR→MR are visualized in FIG. 5. As shown in Table IV, the GADM performs better than three baseline methods. The average classification accuracy of GADM is 71.97%, gaining a performance improvement of 2.94% over ADDA and 3.94% compared to the third best method Fine-tune CNN. And the standard CNN only gets an average accuracy of 53.16%. GADM outperforms it with a significant improvement of 18.81%. In FIG. 5, the ROC curve of GADM has the largest area, which means GADM has the best domain adaptation performance. The results verify that GADM achieve robust and effective performance on domain adaptation.

TABLE IV

ACCURACY (%) OF ALGORITHMS ON DIABETIC RETINOPATHY DATASETS

| | MR→DR | | DR→MR | |
|---|---|---|---|---|
| Algorithms | Accuracy | AUC | Accuracy | AUC |
| CNN | 0.5032 | 0.5305 | 0.5600 | 0.5616 |
| Fine-tune CNN | 0.753 | 0.8063 | 0.6075 | 0.5933 |
| | (+24.9%) | (+27.6%) | (+4.8%) | (+3.2%) |
| ADDA | 0.7623 | 0.8281 | 0.6183 | 0.6599 |
| | (+25.9%) | (+29.8%) | (+5.8%) | (+9.8%) |
| GADM | 0.7911 | 0.851 | 0.6483 | 0.6861 |
| | (+28.8%) | (+32.1%) | (+8.8%) | (+12.5%) |

Performance Analysis

The performance of GADM can be obtained by two indexes, which are classification accuracy calculated by (16) and cross-domain MMD-based distance $D_{MMD}$ calculated by (17). We conduct performance analysis on all datasets but only present results on U→M and M→U due to space limitation. Analysis results on other datasets show a similar trend.

Figure 6:
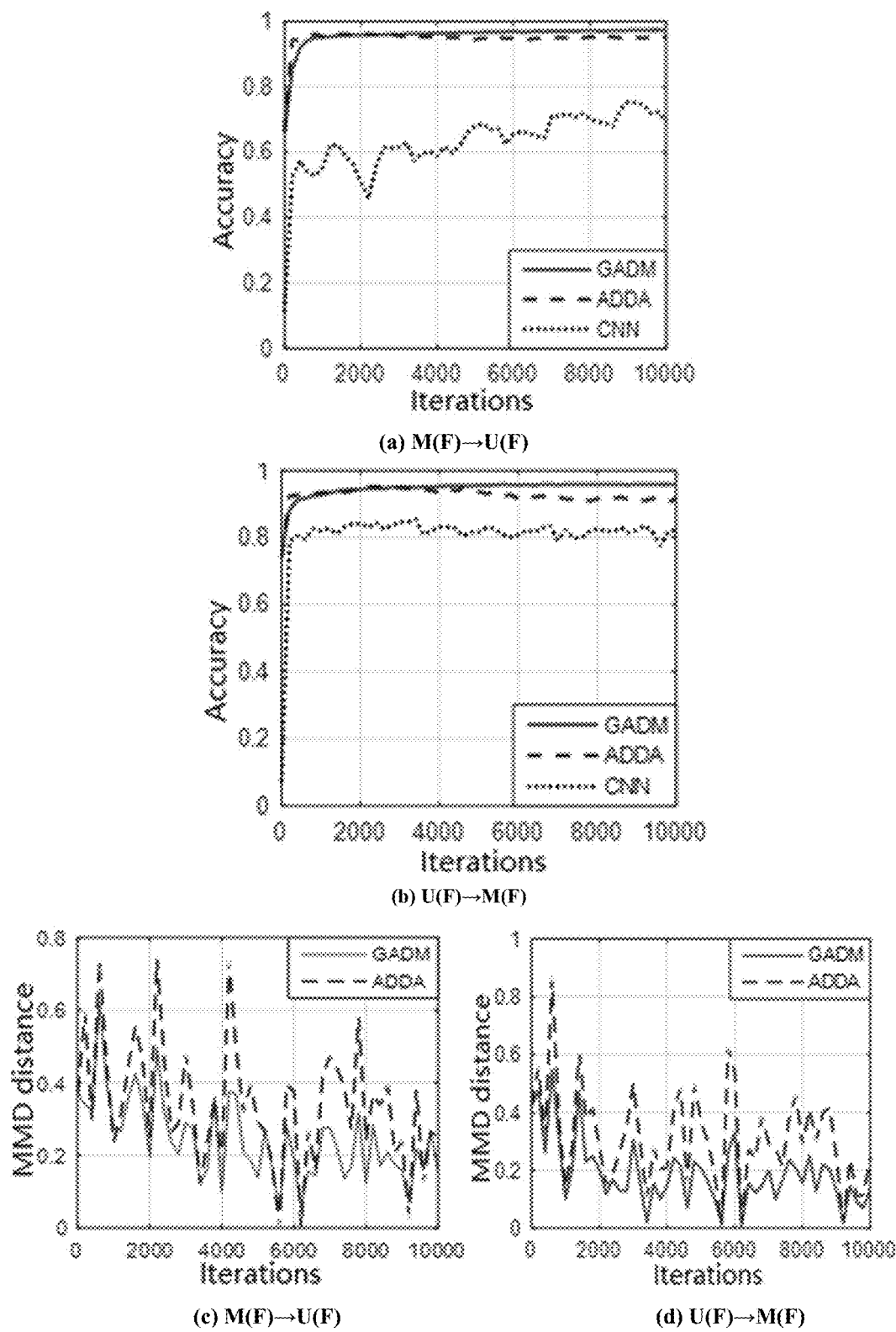
FIG. 6 shows a series of illustrations of performance metrics of GADM, ADDA and CNN.

Firstly, we carry out experiments to compare the classification accuracy of GADM and the most related method ADDA and the baseline method CNN. As shown in FIGS. 6 (a) and (b), the red solid line and blue dash line represent GADM and ADDA respectively, while the Gray dotted line represents standard CNN. It illustrates that GADM has the best performance compared to ADDA and CNN on cross-domain datasets. Thus, it means ADDA can benefit to the solution of domain adaptation problems.

Secondly, in order to analyze the performance of GADM in detail, $D_{MMD}$ are calculated under the iterative process, which is shown in FIGS. 6 (c) and (d). The red solid line and blue dash line represent GADM and ADDA respectively. As iteration proceeds, $D_{MMD}$ of GADM and ADDA have a downward trend. In addition, the red solid line is always below the blue dash line, which means GADM is more conductive to declining the distribution difference across domains, thus obtaining better domain adaptation performance.

Parameter Sensitivity

Compared to ADDA, GADM adds the cross-domain MMD constraint to the generator's objective function, which helps decrease the cross-domain distribution difference during the confrontation between a generator and discriminator. Thus, we implement sensitivity analysis on MMD weight $\alpha$. We conduct such analysis on the U→M, M→U, S→M and S→U datasets. Note that we have observed similar trends on all other datasets, which are not shown due to space limitation.

Figure 7:
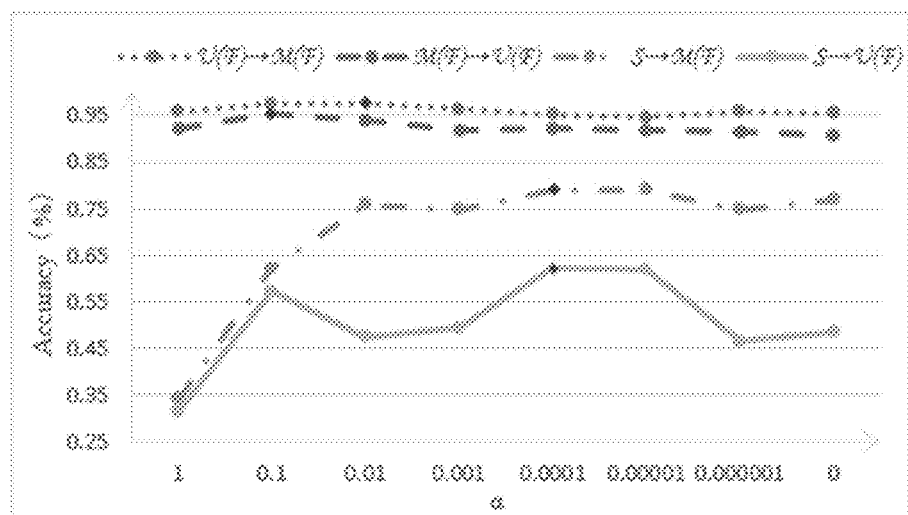
FIG. 7 is a graph showing the sensitivity of parameter of MMD weight in terms of accuracy.

We conduct experiments with varying values of $\alpha$. FIG. 7 shows the result of classification accuracy. Considering the results in FIG. 7, we are able to conclude that on easier tasks, i.e., U→M and M→U, the larger value of $\alpha$ is beneficial to improve the domain adaptation performance of GADM. We thus suggest to select $\alpha \in [0.01, 0.1]$ in this situation. For harder tasks, i.e., S→M and S→U, when parameter $\alpha = 0.0001$, the classification accuracy is higher than others. Thus we recommend to apply $\alpha \in [0.0001, 0.001]$ when the distribution across-domains varies greatly. Then the value of domain discrimination loss and MMD loss can keep proportionally balanced, eliminating a too-large gradient of the MMD term.

TABLE V

WILCOXON'S TEST AND T-TEST RESULTS

| Methods | $P_{wilcoxon}$ | $P_{t\text{-}test}$ | Result |
|---|---|---|---|
| GADM vs CNN | 0.028 | 0.017650 | + |
| GADM vs ADDA | 0.028 | 0.035546 | + |

Note:
"+" represents GADM significantly performs better.

Time Complexity

We compare GADM with ADDA and standard method CNN, while other baseline methods are unnecessary to compare due to their poor performance. As shown in Section III, the time complexity of GADM is:

$$O(GADM) = O\left(N \cdot m \left(\sum_{i=1}^{C} M^2 K^2 C_{i-1} C_i + \sum_{j=1}^{F} F_{j-1} F_j + \alpha_j \sum_{j=1}^{F} F_j + \sum_{j=1}^{P} P_{j-1} P_j \right)\right) \quad (18)$$

The time complexity of ADDA and CNN as follows:

$$O(ADDA) = O\left(N \cdot m \left(\sum_{i=1}^{C} M^2 K^2 C_{i-1} C_i + \sum_{j=1}^{F} F_{j-1} F_j + \sum_{j=1}^{P} P_{j-1} P_j \right)\right) \quad (19)$$

$$O(CNN) = O\left(N \cdot m \left(\sum_{i=1}^{C} M^2 K^2 C_{i-1} C_i + \sum_{j=1}^{F} F_{j-1} F_j \right)\right) \quad (20)$$

Since the time complexity of $$\sum_{j=1}^{F} F_j$$

in (18) is about one order of magnitude less than $$\sum_{j=1}^{F} F_{j-1} F_j$$

in (19), the time complexity of GADM is similar to ADDA's. Theoretically based on (18)-(20) we can roughly conclude in terms of computational complexity:

$$O(CNN) < O(ADDA) \approx O(GADM) \quad (21)$$

We also check the time required to handle all datasets. All experiments are carried out in Tensorflow with NVIDIA Tesla P4 GPU and 8G memory. From Table VI we see that the time required by GADM is similar to ADDA's. In conclusion, the GADM can obtain better classification performance without increasing more execution time than ADDA.

TABLE VI

SUMMARY OF RUNNING TIMES (IN SECONDS)

| Datasets | CNN (Source only) | ADDA | GADM |
|---|---|---|---|
| M→U | 995.54 | 2515.51 | 2516.97 |
| U→M | 1033.87 | 2544.69 | 2561.07 |
| S→M | 1095.19 | 2681.86 | 2686.35 |
| S→U | 1095.19 | 2676.31 | 2696.43 |
| M→S | 995.54 | 2587.16 | 2577.5 |
| U→S | 1033.87 | 2610.7 | 2632.34 |
| Average | 1041.53 | 2602.71 | 2611.78 |

The invention claimed is:

1. A system for fast and accurate visual domain adaptation, comprising:
a computer system having
a domain database storing images from different domains,
a cloud server with the Generative Adversarial Distribution Matching (GADM) algorithm deployed,
said computer system trained by
accessing the domain database and applying GADM to perform domain adaptation,
wherein the GADM is a Generative Adversarial Network (GAN) based visual domain adaptation incorporating Maximum Mean Discrepancy (MMD) based distance constraint in GAN's objection function,
wherein the GAN structure utilizes a single GAN framework comprising a single generator, a single domain discriminator, and a single classifier,
wherein source feature is kept unchanged and adaptation is conducted towards target data, and
wherein the GADM algorithm is composed of three steps: source domain pre-training, adversarial distribution matching across domains, and target domain classification.

2. The system of claim 1 wherein the source domain pre-training is conducted on sufficient labeled images from source domain and then obtains a source classifier by a standard loss function in supervised learning.

3. The system of claim 1 wherein the adversarial distribution matching across domains is based on GAN's original architecture: one generator network, one discriminator network, one classifier network.

4. The system of claim 3 wherein the generator network is input with target domain images and used as a feature extractor for target data, and is designed with an objective function to minimizing the distribution difference between source feature and target one.

5. The system of claim 3 wherein the generator's objective function contains two parts: the domain discrimination loss term and the proposed MMD loss term.

6. The system of claim 3 wherein the discriminator network is input with both source features and target features and is used as a domain classifier with an objective function to minimizing the domain misclassification.

7. The system of claim 3 wherein the classifier network is input with source domain images and is also used as a feature extractor for source data.

8. The system of claim 1 wherein the target domain classification is based on the pre-trained source classifier.

* * * * *